United States Patent
Wu

(10) Patent No.: US 9,218,655 B2
(45) Date of Patent: Dec. 22, 2015

(54) BRIGHTNESS MEASUING METHOD AND SYSTEM OF DEVICE WITH BACKLIGHT

(71) Applicants: LITE-ON ELECTRONICS (GUANGZHOU) LIMITED, Guangzhou (CN); LITE-ON TECHNOLOGY CORPORATION, Taipei (TW)

(72) Inventor: Chin-Fa Wu, New Taipei (TW)

(73) Assignees: LITE-ON ELECTRONICS (GUANGZHOU) LIMITED, Guangzhou (CN); LITE-ON TECHNOLOGY CORPORATION, Taipei (TW)

(*) Notice: Subject to any disclaimer, the term of this patent is extended or adjusted under 35 U.S.C. 154(b) by 261 days.

(21) Appl. No.: 14/047,068

(22) Filed: Oct. 7, 2013

(65) Prior Publication Data

US 2014/0198205 A1    Jul. 17, 2014

(30) Foreign Application Priority Data

Jan. 16, 2013    (CN) .......................... 2013 1 0016556

(51) Int. Cl.
| H04N 17/00 | (2006.01) |
| H04N 17/02 | (2006.01) |
| G06T 7/00 | (2006.01) |
| H04N 5/94 | (2006.01) |
| H04N 9/88 | (2006.01) |

(52) U.S. Cl.
CPC ....... G06T 7/001 (2013.01); *G06T 2207/10016* (2013.01); *G06T 2207/10152* (2013.01); *G06T 2207/30121* (2013.01)

(58) Field of Classification Search
USPC ......... 348/180, 181, 184, 187, 188, 189, 190, 348/191; 386/263
See application file for complete search history.

(56) References Cited

U.S. PATENT DOCUMENTS

| 5,572,444 A * | 11/1996 | Lentz et al. ................... 702/117 |
| 2002/0190972 A1* | 12/2002 | Ven de Van ................... 345/204 |
| 2006/0007222 A1* | 1/2006 | Uy ................................. 345/207 |
| 2013/0076899 A1* | 3/2013 | Eckelmann-Wendt et al. ............................ 348/143 |

* cited by examiner

*Primary Examiner* — Daquan Zhao
(74) *Attorney, Agent, or Firm* — Li & Cai Intellectual Property (USA) Office

(57) ABSTRACT

A brightness measuring method of device with backlight is performed by a controlling device, for measuring legends of backlight provided by a backlight module of a device under test (DUT). The method includes turning on a uniform light source external to the DUT for illuminating the DUT; capturing and receiving an image of the DUT illuminated with uniform light as a base image; identifying a complete pattern of a to-be-measured legend in the base image; turning off the uniform light source and turning on the backlight of the DUT so as to illuminate the legend of DUT; capturing and receiving an image of the DUT illuminated with backlight as a comparison image, wherein the scope of the comparison image overlaps the scope of the base image; and calculating brightness values of a plurality of pixels in the comparison image whose positions overlap the positions of the complete pattern.

12 Claims, 5 Drawing Sheets

BRIGHTNESS MEASUING METHOD AND SYSTEM OF DEVICE WITH BACKLIGHT

BACKGROUND OF THE INVENTION

1. Field of the Invention

The present disclosure relates to a measuring method and system of device with backlight; in particular, to a brightness measuring method and system of device with backlight.

2. Description of Related Art

When the device with backlight provides the backlight for illuminating the legends of the device, usually the backlight fails to uniformly illuminate each position on the legends due to the obstruction of the wire structure between the backlight module and the legends of the electronic device. As shown in FIG. 1, FIG. 1 illustrates a legend of key on a keyboard with backlight. The inside circuit wire of the keyboard may pass exactly through the left side of the legend "Backspace" and obstructs the rear backlight source slightly, thus resulting in that the brightness of four letters "Back" is slightly lower than the brightness of the five letters "space". In order to measure the effect of illuminating the legend of the device with the backlight of the device, in the current measuring method the image of the legend that is illuminated by the backlight will be photographed, then according to the brightness value of each pixel and a predetermined threshold value, a part of the legend and an outside part of the legend are divided.

Referring to FIG. 2. FIG. 2 illustrates a schematic diagram of a bi-level image corresponding to the legend "Backspace" as shown in FIG. 1 after photographing and division in accordance with the threshold value. Comparing FIG. 2 with FIG. 1, most of pixels displayed after sifting the brightness value of the pixel are accurately corresponding to the legend or the background outside the legend. However, the pixels corresponding to upper half of the first letter and the second letter "Ba" is determined as the part outside the legend due to the lower brightness value after sifting. Accordingly, when the user calculates the brightness of the legend "Backspace" illuminated with the backlight according to the pixels shown in FIG. 2, he may inappropriately neglect the pixels of the upper half of the letters "Ba" which originally belong to the part of legend but are viewed as the part outside the legend. Therefore, the total brightness of the legend is overestimated, wherein the part of insufficient brightness cannot be really presented. That is, the calculated total brightness of the legend "Backspace" is not correct. If the measured brightness is not correct, the structure design of the device under test (DUT) or the improvement of the backlight module will be affected.

SUMMARY OF THE INVENTION

Due to the problem of current measuring technology, the object of the present disclosure is to provide a brightness measuring method and system of device with backlight, so as to accurately measure the brightness of the legend of the device when illuminating the device with the backlight.

The exemplary embodiment of the present disclosure provides a brightness measuring method of device with backlight, performed by a controlling device for measuring a legend of backlight provided by a backlight module of a device under test (DUT), the method comprises: turning on a uniform light source external to the DUT so as to illuminate the DUT; indicating to capture a base image and receiving the base image, wherein the base image is an image of the DUT illuminated with the uniform light source; identifying a complete pattern of the to-be-measured legend in the base image; turning off the uniform light source while turning on a backlight source of the DUT, so as to let the backlight source illuminate the legend of the DUT; indicating to capture a comparison image, wherein the comparison image is an image of the DUT illuminated with the backlight source, wherein the image scope of the comparison image overlaps that of the base image; calculating the brightness values of a plurality of pixels in the comparison image overlapped with the complete pattern to obtain a backlight brightness of the to-be-measured legend.

Besides, the exemplary embodiment of the present disclosure further provides a brightness measuring system of device with backlight, used for measuring a legend of the backlight provided by a backlight module of a DUT, and the system comprises an image-capturing device, a luminous device, and a controlling device. The image-capturing device is used for capturing the image of the DUT. The luminous device is used for providing a uniform light to illuminate the DUT. The controlling device is coupled to the image-capturing device, the luminous device and the DUT, and controls the luminous device and a backlight module inside the DUT to be turned on/off; and the controlling device controls the image-capturing device to capture an image of the DUT as a base image when the luminous device is turned on, while capturing an image of the DUT as a comparison image when the luminous device is turned off and the backlight module is turned on. The image scope of the comparison image is identical to that of the base image. The controlling device identifies a complete pattern of a to-be-measured legend in the base image and calculates the brightness values of a plurality of pixels in the comparison image overlapped with the complete pattern to obtain a backlight brightness of the to-be-measured legend.

To sum up, the exemplary embodiment of the present disclosure provides a brightness measuring method and system of device with backlight, capable of accurately measuring the brightness of the legend on the DUT illuminated with the backlight, so as to avoid determining the part of legend with lower brightness as the background due to non-uniform illumination of backlight, resulting in a wrong brightness evaluation outcome.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

Figures 1, 2:
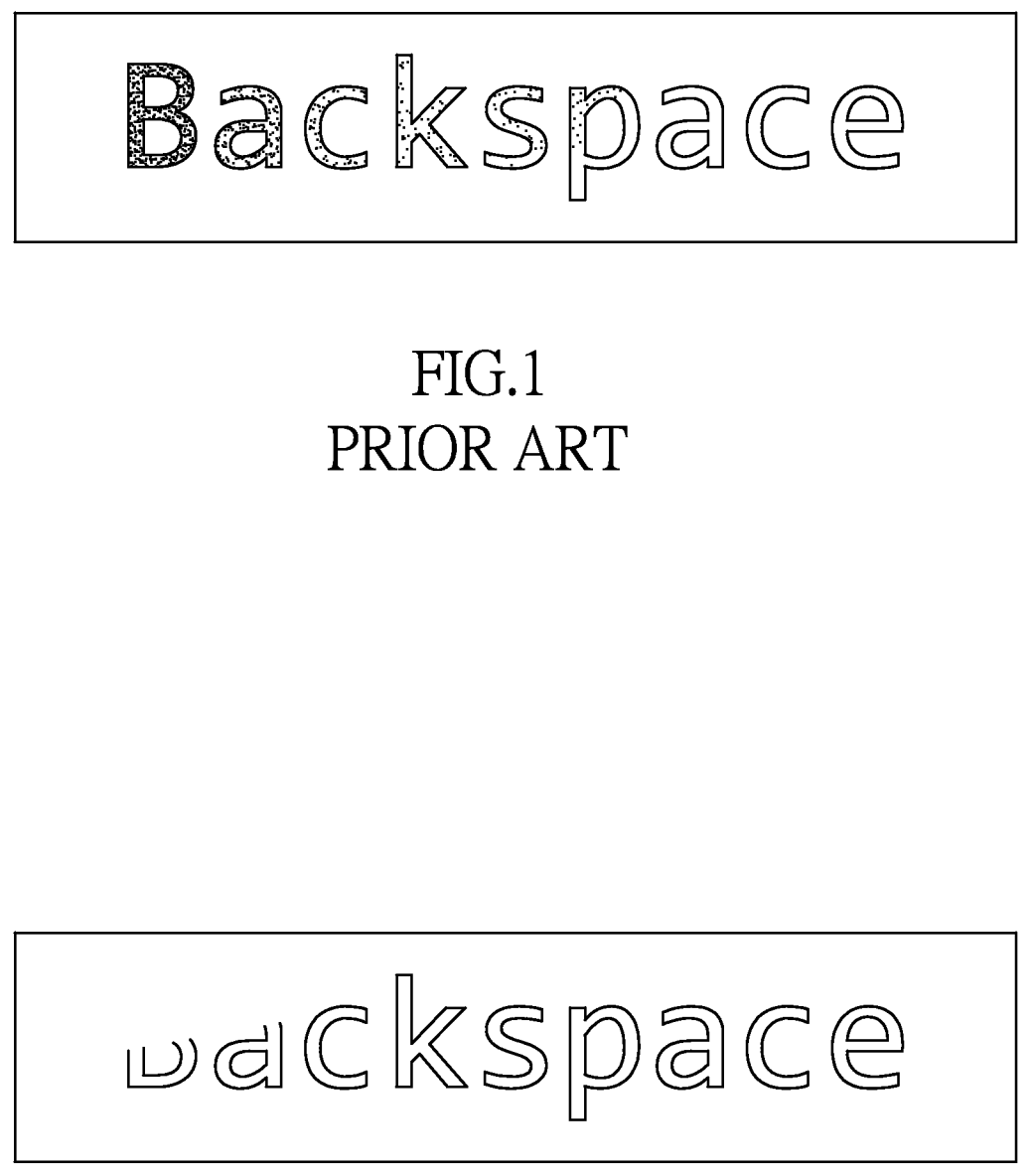

FIG. 1 is a schematic diagram of a part of a legend on a keyboard with backlight;

FIG. 2 is a schematic diagram of a bi-level image corresponding to the legend in FIG. 1;

DETAILED DESCRIPTION OF THE PREFERRED EMBODIMENTS

Figure 3:
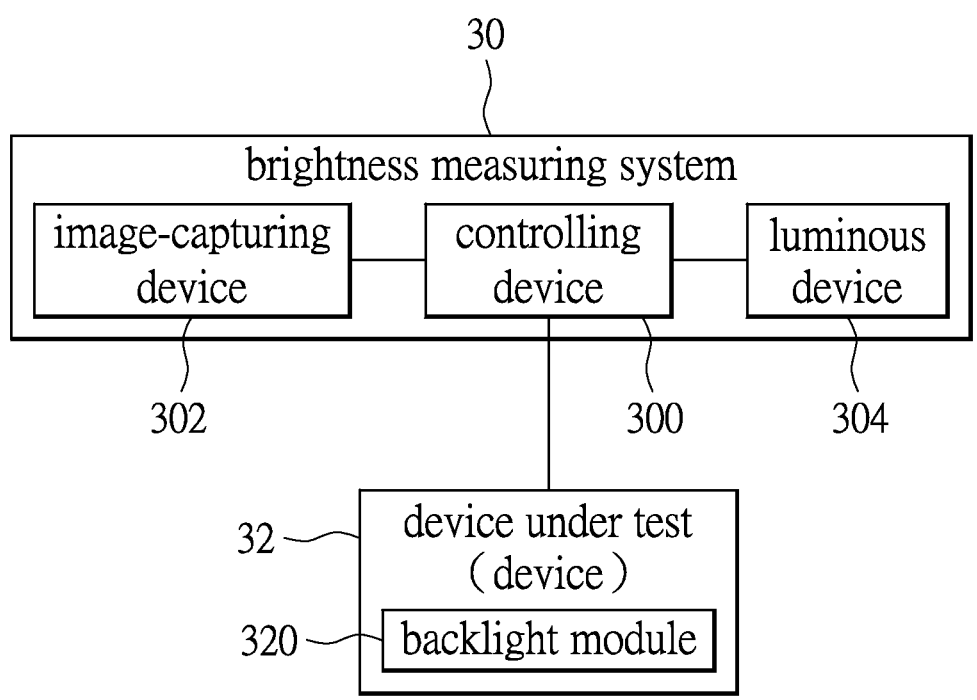
FIG. 3 is a block diagram of a brightness measuring system of device with backlight according to an exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or similar parts.

Exemplary Embodiment of Brightness Measuring System

FIG. 3 illustrates a block diagram of a brightness measuring system of device with backlight according to an exemplary embodiment of the present disclosure. The brightness measuring system 30 comprises a controlling device 300, an image-capturing device 302, and a luminous device 304. The device under test (DUT) 32 with backlight comprises a backlight module 320. The controlling device 300 is coupled to and controls the image-capturing device 302 and the luminous device 304. Besides, the controlling device 300 is also coupled to the DUT 32, so that the controlling device 300 can control the backlight module 320 to be turned on/off.

The controlling device 300 may be, for example, a computer or other electronic devices, wiredly or wirelessly connected to the above devices through a network for transmitting instructions and receiving data. The image-capturing device 302 may be, for example, a CCD or a CMOS camera, used for capturing the image of the DUT 32 and transmitting the image to the controlling device 300 for processing. The luminous device 304 may be, for example, a searchlight, an illumination lamp, or a light-emitting diode (LED), used for emitting a uniform light to illuminate the DUT 32. The DUT 32 may be, for example, a keyboard adapted to the electronic devices, or a liquid-crystal display (LCD) panel adapted to the tablet personal computer, or a smartphone. The surface of the DUT 32 contains the legends representing text, numbers, symbols, or other operational functions. The legends are light-transparent, and display higher brightness than other parts of the DUT 32 under illumination of a light source.

On condition that the luminous device 304 is turned on and provides a uniform light for illuminating the DUT 32, the controlling device 300 controls the image-capturing device 302 to capture an image of the DUT 32 as a base image, while on condition that the luminous device 304 is turned off and the backlight device 320 is turned on, the image-capturing device 302 captures an image of the DUT 32 as a comparison image. Afterward, the controlling device 300 calculates the brightness value of a to-be-measured legend on the DUT 32 according to the base image and the comparison image when the backlight module 320 provides the backlight.

In the present embodiment, the image-capturing device 302 can be further set inside a dark room to capture the image, so as to avoid being affected by the environment light and resulting in the reduction of the data accuracy when capturing the base image and the comparison image.

Figure 4:
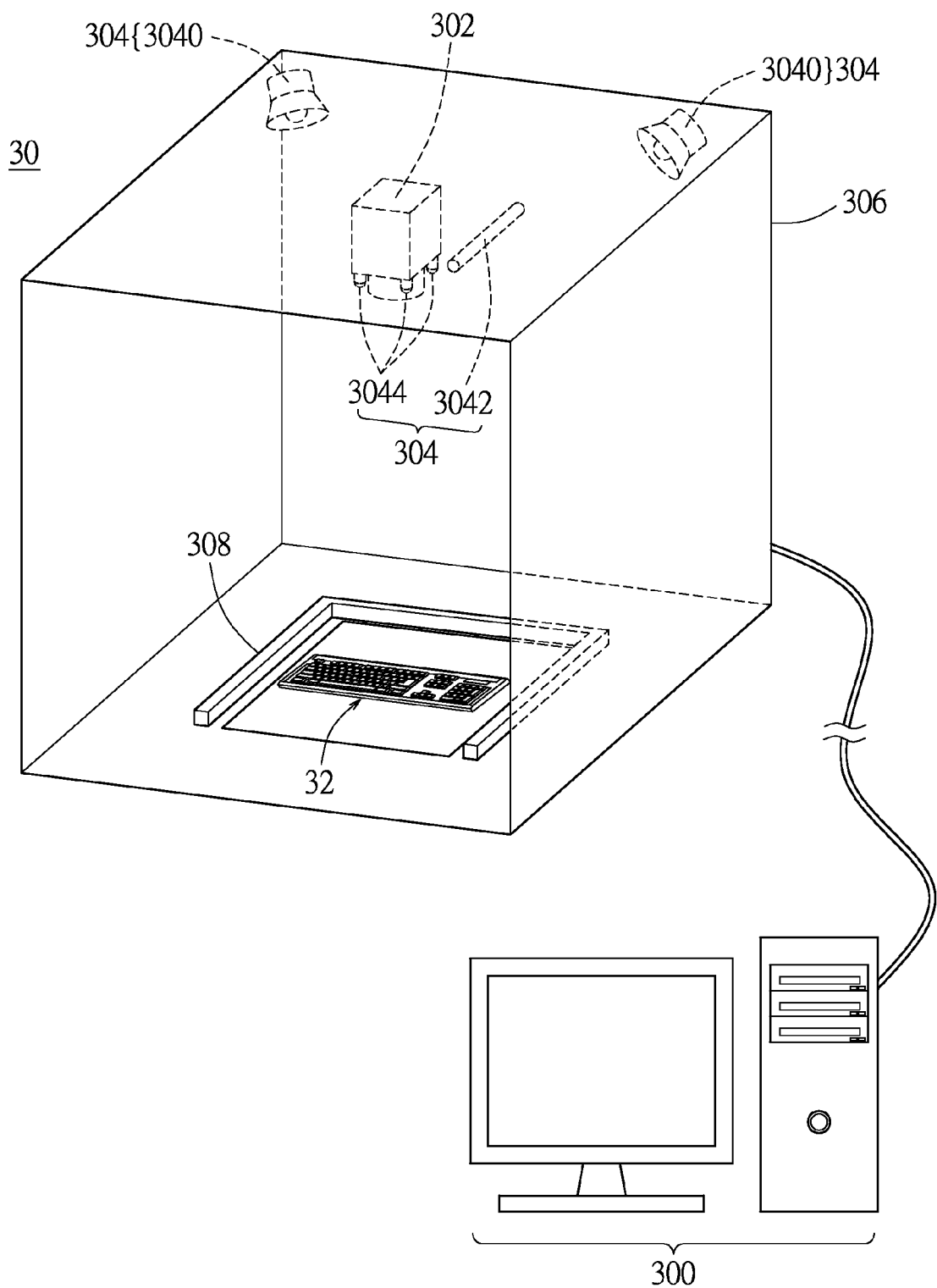
FIG. 4 is a schematic diagram of a brightness measuring system of device with backlight according to an exemplary embodiment of the present disclosure.

Please refer to FIG. 4 which illustrates a schematic diagram of a brightness measuring system 30 according to an exemplary embodiment of the present disclosure so as to describe the structure of the brightness measuring system 30. The brightness measuring system 30 in the present embodiment further comprises a dark box 306 and a positioning structure 308. The image-capturing device 302, the luminous device 304, and the positioning structure 308 all are set inside the dark box 306. The image-capturing device 302 can be set on the upper part of inner of the dark box 306 and the lens is oriented downward. The positioning structure 308 can be set on the under part of inner of the dark box 306 and faces exactly to the lens of the image-capturing device 302, so that the DUT 32 can be positioned at a fixed measuring position to facilitate the capturing of the image. The luminous device 304 is set above the positioning structure 308 so as to illuminate the surface of the DUT 32 from outside of the DUT 32. The luminous device 304 can be one lighting apparatus for emitting the uniform light as shown in FIG. 4, and is set beside or above the positioning structure 308 so as to uniformly emit light to illuminate the DUT 32. The luminous device 304 may be, for example, a searchlight 3040, an illumination lamp 3042, or light-emitting diodes (LEDs) 3044, or a combination of above devices as shown in FIG. 4. The quantity of the luminous device 304 is not limited in the present disclosure. The position of the luminous device 304 is not limited thereto as shown in FIG. 4.

The dark box 306 can be opened to let the DUT 32 be arranged on the measuring position according to the setting of the positioning structure 308. Besides, a power unit (not shown in figure) is electrically connected to the dark box so as to provide the power required to turn on the backlight module 320. After the dark box 306 is closed, the environment light can be isolated except the luminous device 304 and the backlight module.

Return to FIG. 3. After the dark box 306 is closed, the controlling device 300 controls the luminous device 304 to be turned on for illuminating uniformly the DUT 32. Then the controlling device 300 controls the image-capturing device 302 to capture an image of the DUT 32 as a base image and also to receive the base image, while the backlight module 320 of the DUT 32 is not turned on yet. The to-be-measured legend with higher brightness can be displayed distinctly when the uniform light illuminates the DUT 32, just like that the user can see clearly the pattern of each letter on the keyboard when at a place with sufficient light. Accordingly, when the controlling device 300 receives the base image, it can identify a complete pattern of the to-be-measured legend in an image by utilizing obvious difference of the brightness.

Then the controlling device 300 turns off the luminous device 304 and controls the power unit for providing the power to the DUT to turn on the backlight module 320 so as to illuminate outwardly the to-be-measured legend on the DUT 32 from the inner of the DUT 32. At this time, the controlling device 300 indicates the image-capturing device 302 to capture again an image of the DUT 32 as a comparison image and receives the photographed comparison image. The scope of the comparison image received by the controlling device 300 will overlap the scope of the base image and is consistent therewith, because the DUT 32 is still put on the same measuring position by means of positioning of the positioning structure 308.

Because the to-be-measured legend is located on the surface of the DUT 32, both the base image and the comparison image will include the pattern of the to-be-measured legend at the same position. The controlling device 300 identifies a complete pattern of the to-be-measured legend in the base image. Each pixel in the captured base image and the comparison image has its corresponding brightness value, and the unit of the brightness value is a candela per square meter ($cd/m^2$), also called as a nit. As described above, under the illumination of uniform bright light, there is an obvious brightness difference between the part of the to-be-measured legend and the outside part (simply called as background part below) of the to-be-measured legend on the DUT 32. Accordingly, after the base image is photographed, the brightness value of the pixel corresponding to the to-be-measured legend will be obviously higher than the brightness value of the pixel corresponding to the background part. Besides, the to-be-measured legend and the background part are usually differentiated by two colors of evident contrast (for example, the white legend and the black background), thus the brightness values of the pixels corresponding to the same color will be quite similar, for example, the brightness values of the pixels corresponding to the to-be-measured legend will be close to 15 nits, and the brightness values of the pixels corresponding to the background part will be close to 0 nit. The above brightness values are only examples, in fact, when the base image is captured, the brightness value difference between the to-be-measured legend and the background part will be affected by the light intensity from the luminous device 304.

The controlling device 300 can compare the brightness value of each pixel in the base image according to a predetermined or adjustable brightness threshold value, so as to perform a process similar to bi-value thresholding, and the pixels equal to or larger than the brightness threshold value are identified as the pixels corresponding to the to-be-measured legend. For example, presuming that the brightness threshold value is 10 nits, the pixels larger than 10 nits can be identified as the pixels of the to-be-measured legend, while the brightness of the background part is much smaller than 10 nits, thus wrong judgment is not easy to occur. The set of positions of all pixels corresponding to the to-be-measured legend forms a complete pattern of the to-be-measured legend. Because the pixel brightness values of the to-be-measured legend and the background part can be distinctly differentiated, the identified complete pattern can exactly correspond to the actual outline and profile of the to-be-measured legend on the DUT 32. The above brightness values are only for exemplary description and the present disclosure is not limited thereto.

After identifying the complete pattern of the to-be-measured legend, the controlling device 300 may correspondingly select from the comparison image several pixels located at the same positions according to the position of the complete pattern in the base image. Then the controlling device 300 calculates the brightness value of the selected several pixels to generate a backlight brightness of the to-be-measured legend. Specifically, the calculated backlight brightness may be an average value of the brightness values of the selected several pixels.

Because the controlling device 300 selects the pixels to calculate the backlight brightness according to the complete pattern correctly corresponding to the outline and the profile of the to-be-measured legend, the pixels which should be calculated will not be wrongly missed and the backlight brightness of the to-be-measured legend will not be overestimated even if the backlight module can't provide the uniform backlight to let the brightness of a part of pixels corresponding to the to-be-measured legend be too low.

Besides, the surface of the DUT 32 may include a plurality of legends at the same time. Before the controlling device 300 controls the image-capturing device 302 to capture the base image, the controlling device 300 can provide a selection range for selecting the DUT 32, so as to select one of several legends as a to-be-measured legend. For example, the display (not shown in the figure) of the controlling device 300 displays the screen of the DUT 32 detected by the image sensor (not shown in the figure) of the image-capturing device 302, and the user is permitted to determine through the screen of the display a selection range of the screen including a to-be-measured legend. The controlling device 300 can control the image-capturing device 302 to capture the image only for a screen within the determined selection range, or to capture the image of the whole DUT 32 whereas to perform an identification and calculation procedure only for the pixels within the selection range, so as to reduce computation amount and obtain the backlight brightness of the designated measuring legend.

Exemplary Embodiment of Brightness Measuring System

Figure 5:
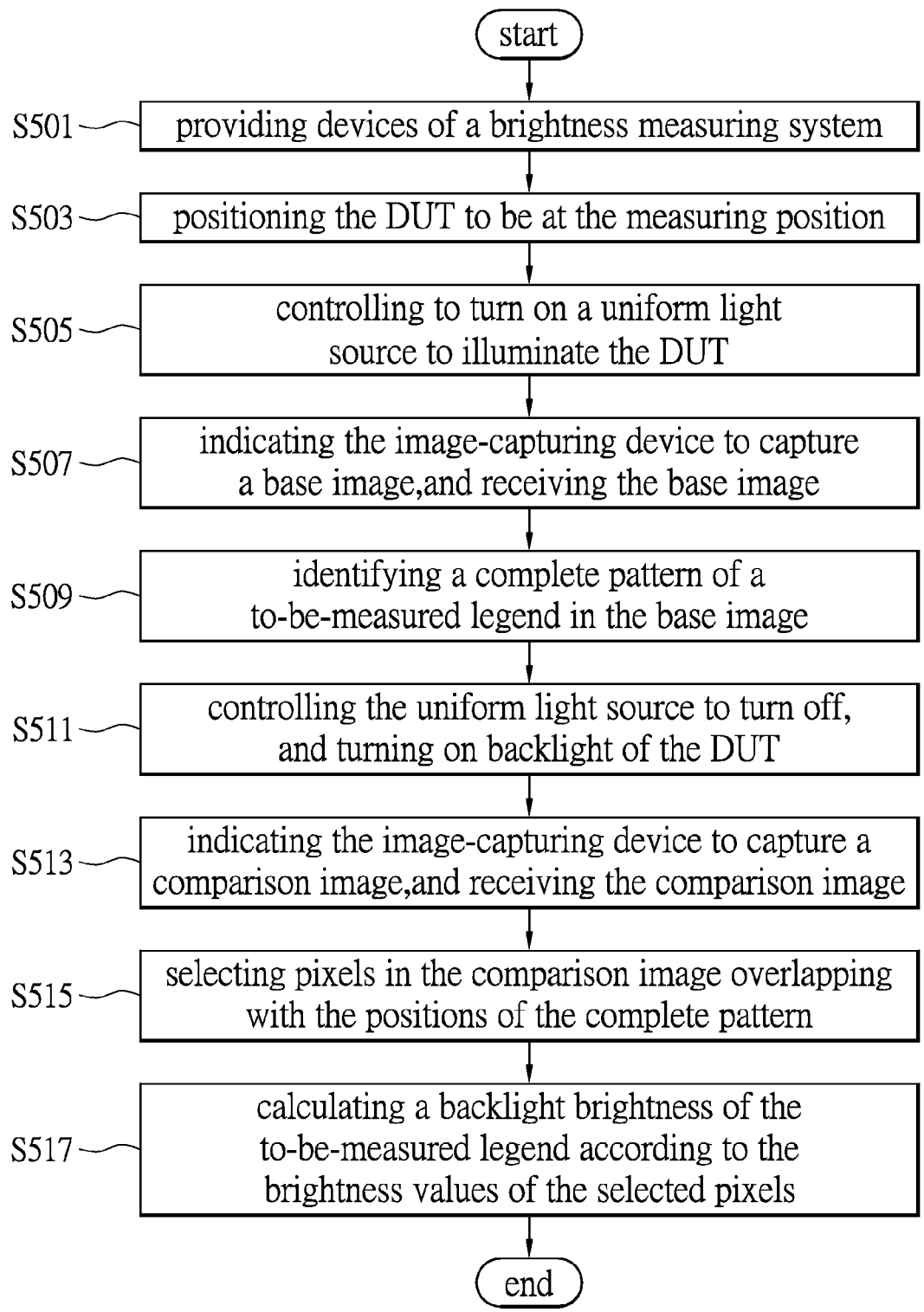
FIG. 5 is a flow chart of a brightness measuring method of device with backlight according to an exemplary embodiment of the present disclosure.

Please refer to FIG. 5. FIG. 5 is a flow chart of a brightness measuring method of a device with backlight according to the exemplary embodiment of the present disclosure. The brightness measuring method in the exemplary embodiment of the present disclosure can be implemented according to the aforementioned exemplary embodiment of the brightness measuring system 30. Please refer to FIG. 5 in conjunction with FIG. 3 and FIG. 4 for facilitating the description.

Before a measurement is performed, each device of a brightness measuring system shown in FIG. 4 is provided (S501), so as to fix the DUT 32 on the measuring position of the dark box 306 to face the lens of the image-capturing device 302 (S503). Then, the controlling device 300 controls the luminous device 304 set externally to the DUT 32 to be turned on and to emit a uniform light to illuminate the surface of the DUT 32 (S505), while the backlight module of the DUT 32 is not turned on. The controlling device 300 indicates the image-capturing device 302 to capture an image of the DUT 32 uniformly illuminated as a base image, and receives the base image captured by the image-capturing device 302 (S507). The pattern of the to-be-measured legend will be displayed in the screen of the base image.

Figure 6A:
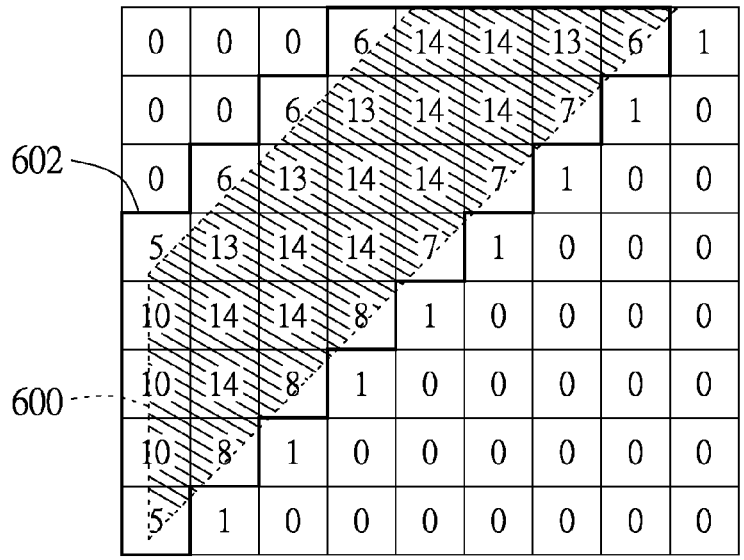
FIG. 6A is a schematic diagram of a base image according to an exemplary embodiment of the present disclosure.

The controlling device 300 identifies a complete pattern of the to-be-measured legend according to the brightness values of several pixels in the base image (S509). Please refer to FIG. 6A that shows a schematic diagram of a base image. In order to understand conveniently, the brightness value of each pixel on the base image is shown in FIG. 6A. Specifically, because the brightness of the legend on the surface of the DUT 32 is usually uniform and apparently larger than the brightness of the background part, the brightness values of the pixels corresponding to the to-be-measured legend 600 are apparently larger than the brightness values of the pixels corresponding to the background part when the controlling device 300 receives the base image 60. The controlling device 300 compares each pixel of the base image 60 according to a predetermined or adjustable brightness threshold value, and records the positions and the brightness values of the pixels whose brightness values are equal to or larger than the brightness threshold value.

Taking FIG. 6A as an example, the brightness threshold value may be 5 nits (in other exemplary embodiments it may be smaller than 5 nits). After the pixels whose brightness values are larger than or equal to the brightness threshold value are recorded, the positions of the recorded several pixels are collected to form a complete pattern of the to-be-measured legend 600. As shown in the schematic diagram of FIG. 6A, 30 pixels in total are recorded as pixels corresponding to the to-be-measured legend 600, and the set of the positions of these pixels forms the complete pattern 602 of the to-be-measured legend 600.

Figure 6B:
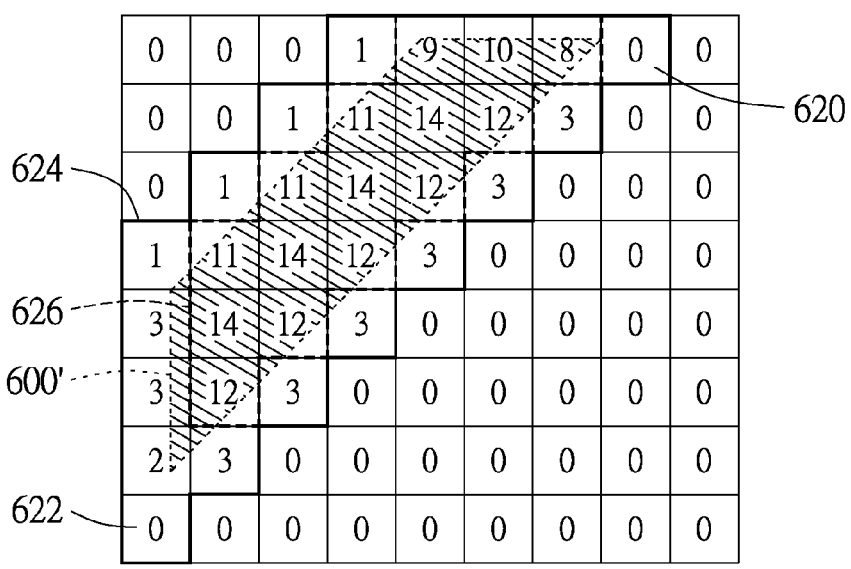
FIG. 6B is a schematic diagram of a comparison image according to an exemplary embodiment of the present disclosure.

Return to FIG. 5. After the controlling device 300 captures the base image, it turns off the luminous device 304 and controls the backlight module 320 of the DUT 32 to be turned on (S511) so as to illuminate outwardly the legend of the surface of the DUT 32 from the inner of the DUT 32. At this time, the controlling device 300 controls the image-capturing device 302 to capture an image of the DUT 32 illuminated by the backlight as a comparison image and the comparison image is transmitted to the controlling device 300 for processing (S513). Please refer to FIG. 6B that shows a schematic diagram of a comparison image corresponding to the base image in FIG. 6A. FIG. 6B also shows the brightness value of each pixel in the comparison image. Because the backlight provided by the backlight module 320 can't illuminate each position of the DUT 32 uniformly, thus in the comparison image 62 the brightness of a part of pixels corresponding to the to-be-measured legend 600' will decrease, even the brightness can't be shown. Taking the pixels shown in FIG. 6B as example, the brightness values of the pixel 620 located on the first row and the eighth column and the pixel 622 located on the eighth row and the first column are zero. Accordingly, the pixels 620, 622 belong to background part if determined according to the screen of the comparison image 62. However, it is found that the pixels 620, 622 are actually corresponding to the pixels of the to-be-measured legend 600 when referring to images at the same positions in FIG. 6A.

Accordingly, in order to exactly determine all pixels corresponding to the to-be-measured legend 600, the controlling device 300 selects several pixels in the comparison image according to the pixels of the complete pattern 602 identified from the base image 60, wherein the positions of the selected pixels are the same as the positions of the pixels in the base image, for example, for the pixels of pixel area 624 shown in FIG. 6B. Then the controlling device 300 performs a calculation according to the brightness values of several pixels in the pixel area 624 (S515) to generate a backlight brightness of the to-be-measured legend 600' (S517). The backlight brightness may be an average value of the brightness values of all pixels in the pixel area 624. The calculated backlight brightness is the average brightness of the to-be-measured legend 600' under condition that the backlight is provided by the backlight module 320.

By identifying the complete pattern 602 of the to-be-measured legend 600 according to the base image 60 (FIG. 6A), the complete outline and the profile of the pattern 602 are obtained. Then the brightness values of the pixels in the comparison image 62 (FIG. 6B) are calculated according to the quantity and the positions of the pixels corresponding to the complete pattern 602, and the actual brightness information of the to-be-measured legend can be exactly measured under the illumination with non-uniform backlight. Taking FIG. 6A and FIG. 6B as example, the pixels in the comparison image 62 used for calculating the backlight brightness of the to-be-measured legend 600' is the 30 pixels in the pixel area 624, and the calculated average brightness value is 6.87 nits.

If directly calculating the backlight brightness of the to-be-measured legend 600' according to the screen presented by pixels in the comparison image 62 in FIG. 6B, and presuming that the brightness threshold value is 5 nits so as to determine the pixels corresponding to the to-be-measured legend 600'. Only 15 pixels in the pixel area 626 are used for calculating the backlight brightness. The other pixels that result in too low brightness due to non-uniform backlight are viewed as the background part and neglected. The calculated backlight brightness is 11.73 nits according to the brightness values of 15 pixels in the pixel area 626, and shows a great error when compared with the above 6.87 nits, so the backlight brightness of the to-be-measured legend 600' is obviously overestimated. Even if setting the brightness threshold value as larger than 0 nit (that is, the pixel is corresponding to the to-be-measured legend so long as the brightness value is not zero), the comparison image 62 still loss a part of pixels 620, 622 that really belong to the to-be-measured legend 600' when compared with complete pattern 602 in the base image 60 of FIG. 6A. The calculated average brightness is 7.36 nits and the error is nearly 0.5 nits when compared with the exact backlight brightness.

These neglected pixels (the part for which the pixel area 624 does not overlap the pixel area 626, or the pixels 620 and 622 in another exemplary embodiment) actually should be represented in the backlight brightness so as to show the insufficiency of the brightness of the to-be-measured legend 600' due to the illumination with the non-uniform backlight. Accordingly, by means of the backlight brightness obtained by the brightness measuring method according to the exemplary embodiment of the present disclosure, the user can exactly evaluate the actual brightness of the to-be-measured legend under the illumination of the backlight module. The correct information for improving the backlight module 320 or the structure design of the DUT 32 can be provided to the user.

Besides, the surface of the DUT 32 may include a plurality of legends. Before the step of S507, the controlling device 300 can further select a part of the DUT 32 according to a selection range, and then determines the legend included within the selection range as the to-be-measured legend. When capturing the image of the DUT 32 in the steps S507 and S513, only the images within the selection range can be captured respectively as the base image and the comparison image, or only the pixels within the selection range are identified and calculated respectively after capturing the image of the whole DUT 32.

Possible Efficacy of Exemplary Embodiment

According to the exemplary embodiment of the present disclosure, the aforementioned brightness measuring method and system of device with backlight capture the complete outline and the profile of the to-be-measured legend firstly, and then calculate the exact backlight brightness when the to-be-measured legend is illuminated with the backlight. It can avoid the part of the to-be-measured legend which has too low brightness is excluded and the backlight brightness of the to-be-measured legend is overestimated.

At the same time, taking the complete pattern exactly corresponding to the outline and the profile of the to-be-measured legend as a standard, all pixels corresponding to the legend can be obtained from the image. Thereby, the brightness of the legend can be calculated objectively so as to solve the irrational situation "in the current method, the more non-uniform the backlight is, the larger the calculated backlight brightness may be" when the backlight brightness is determined directly according to the image of the legend illuminated with backlight.

Besides, according to the exemplary embodiment of the present disclosure, the aforementioned brightness measuring method and system of device with backlight can further measure any legend on the DUT including several legends. Therefore, an individual backlight brightness of each legend on the DUT is obtained. The subsequent analyses of the legend on the DUT, the backlight module, or the position arrangement of the device structure are helpful.

The aforementioned descriptions represent merely the exemplary embodiment of the present disclosure without any intention to limit the scope of the present disclosure thereto. Various equivalent changes, alternations or modifications based on the claims of present disclosure are all consequently viewed as being embraced by the scope of the present disclosure.

What is claimed is:

1. A brightness measuring method of device with backlight, performed by a controlling device to measure a legend of backlight provided by a backlight module of a device under test (DUT), the method comprising:
   turning on a uniform light source external to the DUT so as to illuminate the DUT;
   indicating to capture an image of the DUT illuminated with the uniform light source as a base image;
   receiving the base image;
   identifying a complete pattern of a to-be-measured legend in the base image;
   turning off the uniform light source while turning on the backlight of the DUT, so as to let the backlight illuminate the DUT;
   indicating to capture an image of the DUT illuminated with the backlight as a comparison image;
   receiving the comparison image, wherein the scope of the comparison image overlaps the scope of the base image; and
   calculating the brightness values for a plurality of pixels in the comparison image whose positions overlap the positions of the complete pattern so as to obtain a backlight brightness of the legend.

2. The brightness measuring method of device with backlight according to claim 1, wherein after capturing the comparison image, comprising:
   identifying the brightness values of the pixels whose positions in the comparison image overlap the positions of the complete pattern according to the positions of the pixels of the complete pattern in the base image.

3. The brightness measuring method of device with backlight according to claim 1, wherein before providing the uniform light source for illuminating the DUT, the DUT is fixed at a measuring position, and wherein the DUT is located at the measuring position when capturing the base image and the comparison image.

4. The brightness measuring method of device with backlight according to claim 1, wherein the step of calculating the brightness values for a plurality of pixels whose positions in the comparison image overlap the positions of the complete pattern is to calculate an average value of the brightness values of the pixels.

5. The brightness measuring method of device with backlight according to claim 1, wherein the step of identifying the complete pattern of the legend comprises:
   comparing the brightness value of each pixel in the base image according to a brightness threshold value; and
   recording the positions of one or more pixels in the base image whose brightness value are larger than or equal to the brightness threshold value;
   wherein a set of the positions of one or more pixels in the base image whose brightness value are larger than or equal to the brightness threshold value forms the complete pattern.

6. The brightness measuring method of device with backlight according to claim 1, wherein before indicating to capture the base image, comprising:
   selecting a part of the DUT in accordance with a selection range, in which the to-be-measured legend is included;
   wherein the base image and the comparison image both are the images within the selection range.

7. The brightness measuring method of device with backlight according to claim 1, wherein before indicating to capture the base image, comprising:
   selecting a part of the DUT in accordance with a selection range, in which the to-be-measured legend is included;
   wherein the step of identifying the complete pattern and the step of calculating the backlight brightness both are performed for the pixels in the selection range.

8. A brightness measuring system of device with backlight, used for measuring a legend of backlight provided by a backlight module of a DUT, the system comprising:
   an image-capturing device, used for capturing the image of the DUT;
   a luminous device, used for providing a uniform light source to illuminate the DUT; and
   a controlling device, coupled to the image-capturing device, the luminous device and the measured DUT, controlling the luminous device and a backlight module of the DUT to be turned on/off, and controlling the image-capturing device to capture an image of the DUT as a base image when the luminous device is turned on, while capturing an image of the DUT as a comparison image when the luminous device is turned off and the backlight module is turned on;
   wherein the scope of the comparison image overlaps the scope of the base image, the controlling device identifies a complete pattern of a to-be-measured legend in the base image and calculates the brightness values for a plurality of pixels whose positions in the comparison image overlap the positions of the complete pattern in the base image, so as to obtain a backlight brightness of the to-be-measured legend.

9. The brightness measuring system of device with backlight according to claim 8, further comprising:
   a dark box; and
   a positioning structure, being set in the dark box and facing exactly the image-capturing device, used for positioning the DUT to be at a measuring position;
   wherein the image-capturing device and the luminous device are set in the dark box.

10. The brightness measuring system of device with backlight according to claim 9, wherein the luminous device comprises a lighting apparatus, the lighting apparatus is set beside or above the positioning structure.

11. The brightness measuring system of device with backlight according to claim 10, wherein the lighting apparatus is a searchlight, an illumination lamp, or a light-emitting diode.

12. The brightness measuring system of device with backlight according to claim 8, wherein the DUT is a liquid-crystal display panel or a keyboard with backlight.

* * * * *